(12) United States Patent
Howansky

(10) Patent No.: US 7,422,367 B2
(45) Date of Patent: Sep. 9, 2008

(54) BABY RECTAL THERMOMETER

(75) Inventor: Andrew Howansky, Copake Falls, NY (US)

(73) Assignee: Kaz, Incorporated, New York, NY (US)

( * ) Notice: Subject to any disclaimer, the term of this patent is extended or adjusted under 35 U.S.C. 154(b) by 0 days.

(21) Appl. No.: 11/214,659

(22) Filed: Aug. 29, 2005

(65) Prior Publication Data

US 2007/0047618 A1  Mar. 1, 2007

(51) Int. Cl.
*G01K 1/00* (2006.01)
*G01K 7/00* (2006.01)
*A61B 5/00* (2006.01)

(52) U.S. Cl. ............... 374/208; 374/163; 600/549
(58) Field of Classification Search ............ 374/209, 374/208, 163, 158; 600/549; 702/131
See application file for complete search history.

(56) References Cited

U.S. PATENT DOCUMENTS

| 3,878,836 | A | * | 4/1975 | Twentier ............. 600/200 |
| D252,104 | S | * | 6/1979 | Nagy et al. ............. D10/60 |
| 4,856,519 | A | * | 8/1989 | Teves ............. 606/234 |
| 5,559,497 | A | * | 9/1996 | Hong ............. 340/573.1 |
| 6,036,361 | A | | 3/2000 | Gregory et al. |
| 6,241,384 | B1 | * | 6/2001 | Pompei et al. ............. 374/126 |
| 6,336,742 | B2 | * | 1/2002 | Fukura et al. ............. 374/121 |
| 6,402,371 | B2 | | 6/2002 | Pompei et al. |
| 6,419,388 | B2 | | 7/2002 | Lee |
| 6,547,744 | B1 | * | 4/2003 | Pompei et al. ............. 600/549 |
| 6,811,306 | B2 | | 11/2004 | Gerlitz et al. |
| 6,854,880 | B2 | * | 2/2005 | Hsieh ............. 374/163 |
| 6,991,368 | B2 | * | 1/2006 | Gerlitz ............. 374/121 |
| D525,542 | S | * | 7/2006 | Russak et al. ............. D10/57 |
| 2001/0014112 | A1 | * | 8/2001 | Yamaka ............. 374/158 |
| 2002/0131473 | A1 | * | 9/2002 | Konno ............. 374/121 |
| 2004/0028116 | A1 | * | 2/2004 | Lin ............. 374/121 |
| 2004/0233970 | A1 | * | 11/2004 | Conforti ............. 374/208 |
| 2004/0264546 | A1 | * | 12/2004 | Wong et al. ............. 374/209 |
| 2006/0023767 | A1 | * | 2/2006 | Yu ............. 374/121 |
| 2006/0291535 | A1 | * | 12/2006 | Craig et al. ............. 374/208 |
| 2007/0019703 | A1 | * | 1/2007 | Weng et al. ............. 374/121 |

* cited by examiner

*Primary Examiner*—Gail Verbitsky
*Assistant Examiner*—Mirellys Jagan
(74) *Attorney, Agent, or Firm*—Darby & Darby

(57) ABSTRACT

A rectal thermometer for measuring the temperature of a patient including a disk or oval-shaped member having a circumferential edge and first and second sides. Along the edge is a temperature display that is viewable during the temperature taking process without having to first remove the thermometer from the anal canal. The first and second sides form a concave shape and include an actuation switch and battery compartment. Connected to the main housing via a probe guard portion is a controlled-depth temperature sensing probe which can be fully inserted into the anal canal without concern for over-insertion. The probe guard portion, which may be formed of flexible material, is adapted such that its thickness gradually increases proximate the main housing and serves to slow down the entry of the probe within the anal canal. Finally, the rectal thermometer includes a holder having a proximal end for covering the housing and a distal end for covering the probe. The distal end also houses an enclosed portion having rattle balls which allow the thermometer holder to serve as an amusement device for the child.

12 Claims, 3 Drawing Sheets

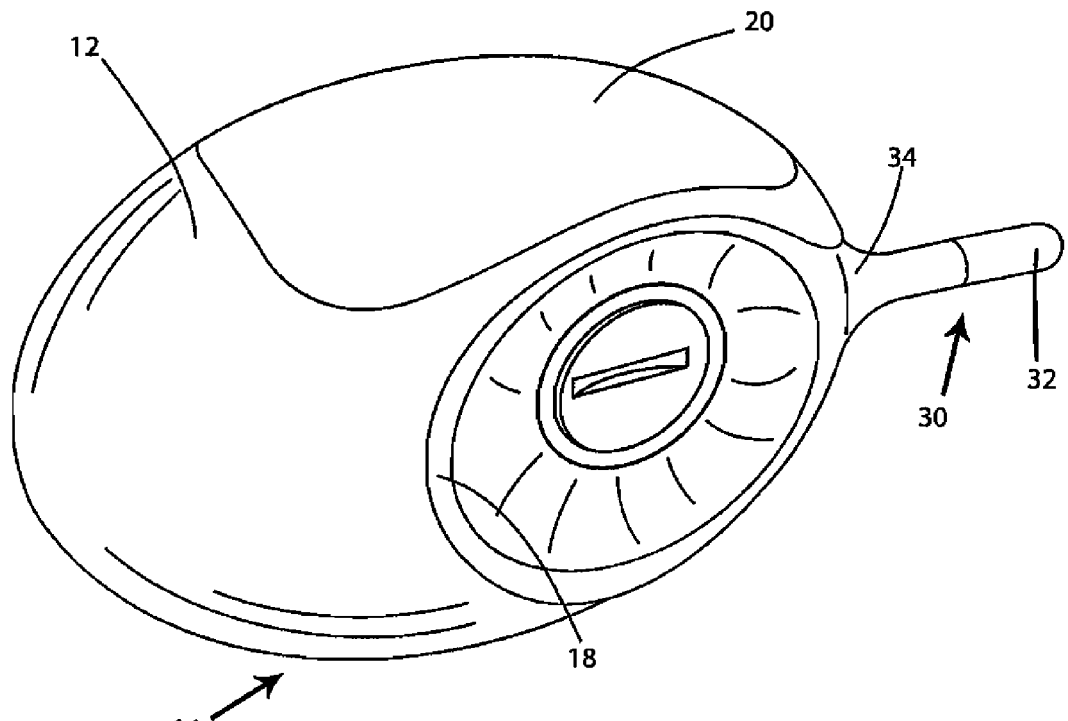
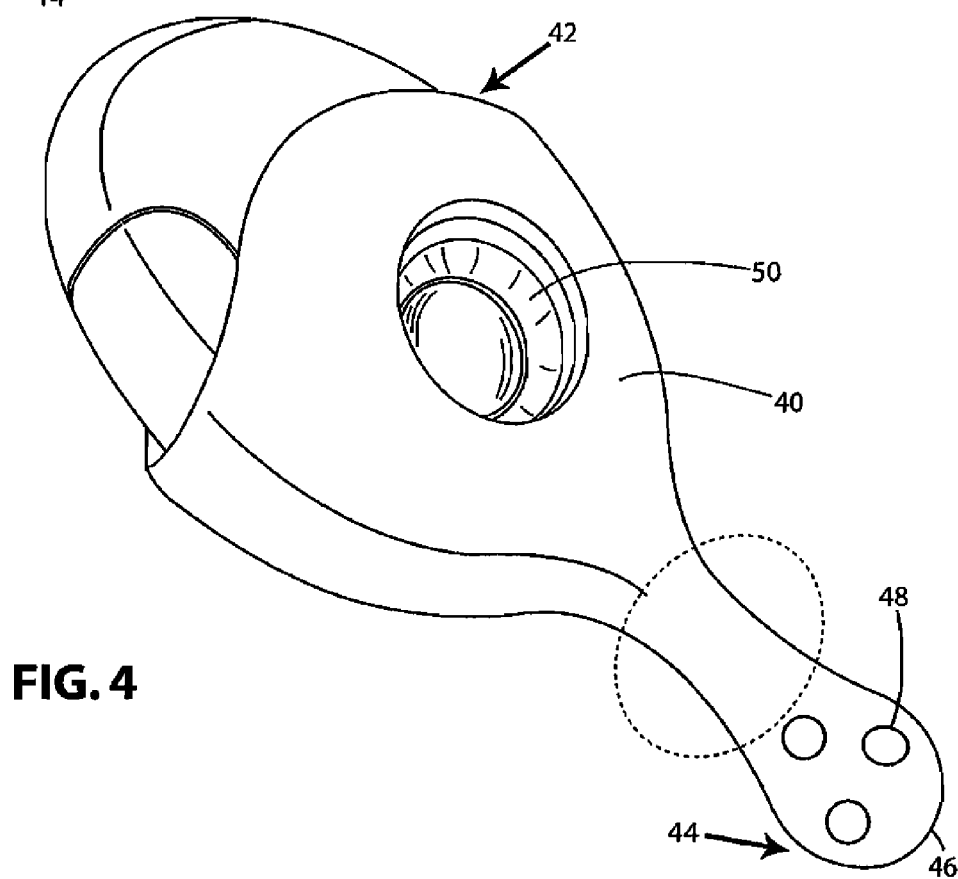

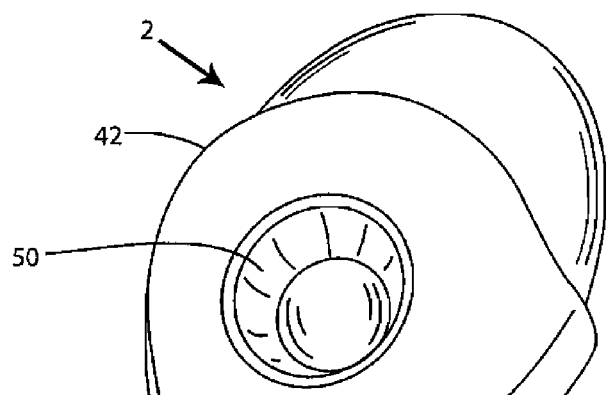
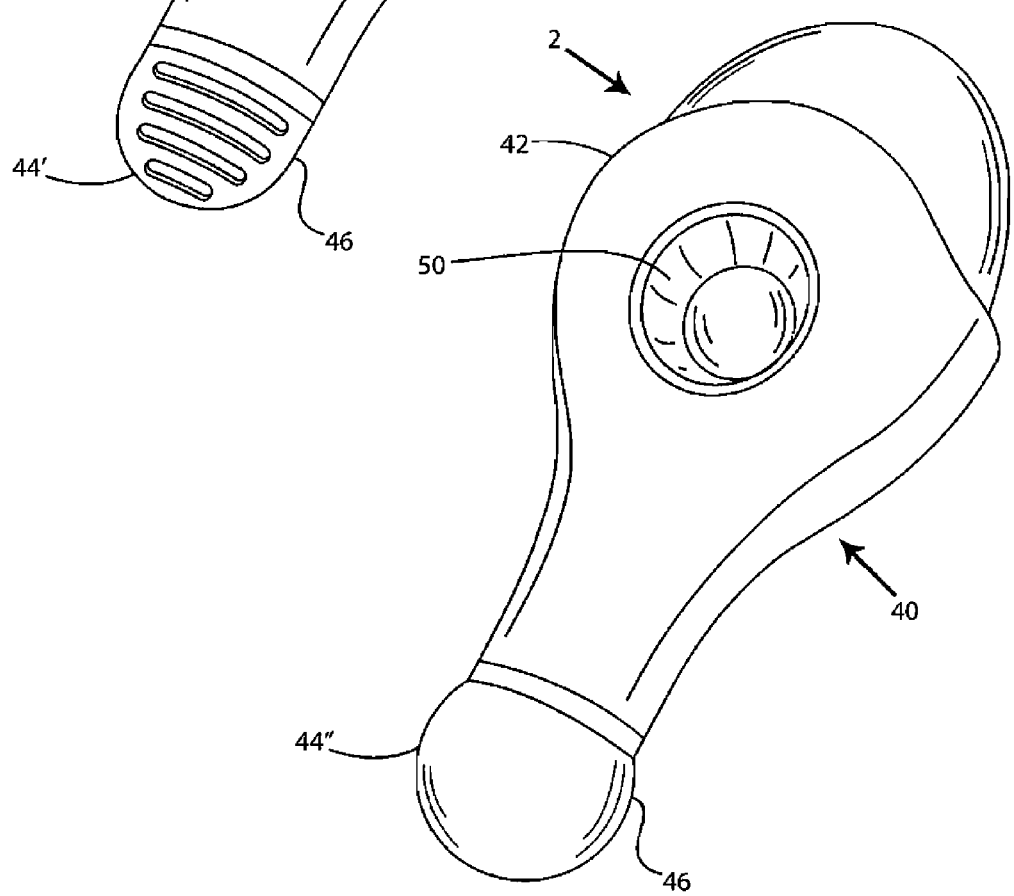

BABY RECTAL THERMOMETER

FIELD OF THE INVENTION

The present invention generally relates to the field of thermometers, and more specifically to a digital rectal thermometer.

BACKGROUND OF THE INVENTION

Electronic medical thermometers that estimate a patient's body temperature have been in common use in the medical community for a number of years. Measuring body temperature can be a critical factor in the treatment of problems or diseases of patients. Thus, determining an individual's body temperature in an accurate and noninvasive manner is essential to providing proper care to the patient. However, patients typically view the temperature taking process as intrusive and uncomfortable. This is especially the case for a neonate having his/her temperature taken through the rectum.

Rectal thermometry, in comparison to oral and axillary thermometry, has traditionally been considered the gold standard for temperature measurement. The reason for this is that the walls surrounding the rectum and anal canal provide the most accurate assessment of an individual's core temperature. Rectal temperature readings are thus able to provide a user, typically a clinician or parent, with an accurate assessment of the individual's, typically a child's, core body temperature.

Accurate core body temperature measurements are essential for monitoring the health and fitness of a newborn child. The possibility of infections and illness in newborn children is especially high. For newborn children, illnesses and infections also have a greater potential to lead to other more serious ailments. As such, the ability to determine the core temperature of newborn children accurately and regularly is of great importance to parents and clinicians.

While rectal temperature measurement is the most practical and accurate assessment of an individual's core body temperature it is nonetheless a process that is affected by many variables. Most notably among the variables are the depth of placement of the rectal temperature measurement device, the presence of stool, and the user's ability to maintain the positioning of the rectal temperature measurement device. The last variable is especially important since the user is typically attempting to take the rectal temperature of a restless and squirming child. Also, the ability to properly sterilize a rectal thermometer is of utmost importance as rectal temperature measuring devices have the capacity to spread contaminants that are commonly found in stool. Finally, the ability of the user to read the temperature being taken while the device remains inserted also adds to the convenience of taking the rectal temperature since repositioning of the rectal probe may cause inaccurate readings and further discomfort to the child.

Rectal temperature measuring devices have been in use for a number of years. Traditional glass and mercury-filled thermometers are poorly suited for use in the rectal area and typically take several minutes to obtain an accurate temperature of an individual. Glass and mercury filled thermometers do not provide the ability to control insertion depth which can result in damage to the rectal tissue. They are also difficult to read. The electronic rectal thermometers currently available, although faster than their mercury-filled predecessors, do not solve all of the problems associated with taking a rectal temperature. Known electronic rectal thermometers typically include an elongated probe that contains a thermal resistor (thermistor) within the tip of the probe. In use, the probe is inserted into the anal canal and the individual's temperature is measured by the thermistor. Although the amount of time required for obtaining a reading is less than that of a glass and mercury filled thermometer, digital rectal thermometers still have problems. Conventional digital rectal thermometers are not washable, are difficult to read due to the positioning of their displays, are awkward to hold in a consistent position within a squirming child, and do not have means for preventing over-insertion.

Accordingly, there remains a need for an improved digital rectal thermometer that is site-specific to the rectal region, provides for greater comfort to patients and those holding the thermometer, increases the accuracy and speed with which the temperature is measured due to controlled-depth insertion, is washable and provides a digital display that is easily read by the user.

SUMMARY OF THE INVENTION

The present invention relates to a thermometer that is designed to obtain and display core body temperature measurements through the rectal region of a patient. The rectal thermometer of the present invention, unlike traditional electronic rectal thermometers, is designed to have a shape that improves the temperature taking process. Specifically, the shape of the rectal thermometer allows for improved placement and repeatable insertion depth of the thermometer into the rectal region. The repeatable insertion depth prevents injury to the patient allowing a user, typically a parent or clinician, to hold the thermometer securely in the patient's rectal region without worrying about the possibility of harming the patient. The rectal thermometer includes a main housing which holds the digital temperature display, an activation switch and a battery compartment. The temperature display provides the user with the ability to read the temperature display throughout the temperature taking process. The sides of the housing may be of a concave shape near their respective centers to improve handling of the thermometer.

Attached to the main housing via a probe guard portion is a controlled-depth temperature sensing probe. The controlled-depth temperature sensing probe guarantees that the thermometer probe tip will be placed at a consistent and proper depth within the anal canal. This results in increased comfort for the patient, improved sensing capabilities, and a more accurate temperature determination. Additionally, the probe guard portion aids in preventing over-insertion of the thermometer probe due to a gradually increasing thickness proximate the housing.

The rectal thermometer may include a removable thermometer holder that is placed over the rectal thermometer when not in use. The thermometer holder includes a proximal end and a distal end and is adapted such that its shape generally conforms to the shape of the rectal thermometer and at least a portion of the rectal thermometer is completely covered by the thermometer holder. Moreover, the proximal end covers at least a portion of the housing and may include openings to allow access to the actuation button and the battery receiving compartment. Finally, the distal end of the thermometer holder includes an enclosed portion which may house rattle balls, thereby allowing the thermometer holder to also serve as a baby rattle. The patient can amuse him or herself with the rattle during the temperature taking process, thus reducing squirming.

In use, the thermometer is removed from the thermometer holder, the temperature sensor is placed in contact with the rectal region, and within the anal canal, to sense the temperature thereof. The temperature sensor produces an electronic signal that represents the body temperature obtained from the rectal region. The electronic signal of the sensor is then transmitted to a processor which converts the electronic signal into a temperature reading. The temperature reading is transmitted to the temperature display unit where the temperature is displayed in degrees Fahrenheit or Celsius. Electronic thermometers, along with features common to electronic thermometers, are described in U.S. Pat. No. 6,419,388 to Lee, U.S. Pat. No. 6,402,371 to Pompei et al., and U.S. Pat. No. 6,036,361 to Gregory et al., the contents of which are incorporated herein by reference.

BRIEF DESCRIPTION OF THE DRAWINGS

The foregoing and other features of the present invention will be more readily apparent from the following detailed description and drawings of illustrative embodiments of the invention in which:

FIG. 3 is a rear perspective view of a rectal thermometer constructed in accordance with the present invention;

FIG. 4 is a perspective view of an alternative design of a rectal thermometer constructed in accordance with the present invention;

FIG. 5 is a perspective view of an alternative design of a rectal thermometer constructed in accordance with the present invention; and FIG. 6 is a perspective view of an alternative design of a rectal thermometer constructed in accordance with the present invention.

DETAILED DESCRIPTION OF THE PREFERRED EMBODIMENTS

Figure 1:
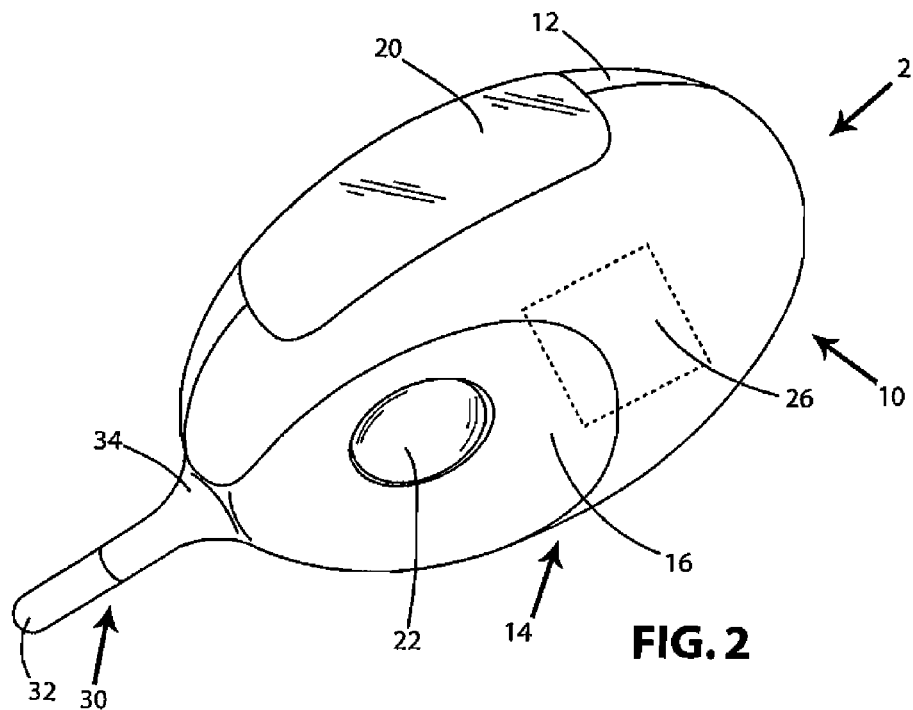
FIG. 1 is a front perspective view of a rectal thermometer constructed in accordance with the present invention.

Referring now to the drawings, the present invention is directed to an improved baby rectal thermometer 2 that is site-specific in that it is designed to take the temperature of a patient via the patient's rectal region. The overall configuration of the rectal thermometer 2 allows for improved placement into the rectal region at a reproducible depth. The thermometer's shape prevents harm to the patient by preventing over-insertion and allows a user to securely and confidently hold the thermometer in place in the rectal region. This results in increased comfort for the patient and user, improved sensing capabilities, and a more accurate temperature determination.

Figure 2:
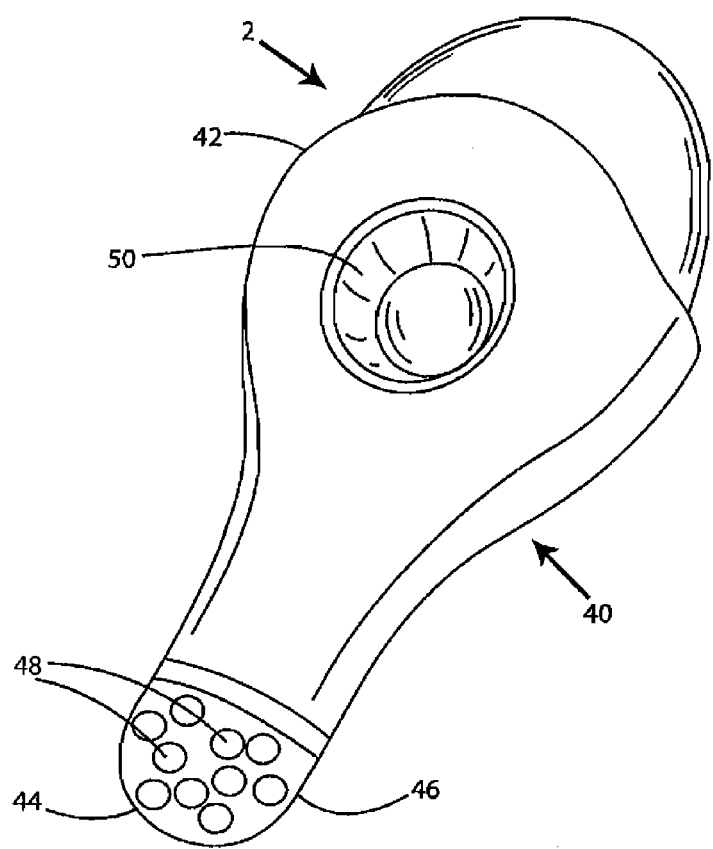
FIG. 2 is a perspective view of a rectal thermometer constructed in accordance with the present invention and having a holder situated on the thermometer.

In accordance with the preferred embodiment illustrated in FIGS. 1 and 2, the rectal thermometer includes a main housing 10, a probe 30 and a thermometer holder 40. The thermometer holder 40 includes a proximal end 42 and a distal end 44 and is adapted so as to conform to the general shape of the rectal thermometer 2. Moreover, the thermometer holder 40 conforms to the general shape of the rectal thermometer 2 such that at least a portion of the rectal thermometer 2 may be completely covered by the holder 40. Also, the thermometer holder 40 includes an enclosed portion 46 at its distal end 44 that houses rattle balls 48, thereby allowing the thermometer holder 40 to also serve as a baby rattle. The detail and functioning of the thermometer holder 40 will be described in further detail below.

The rectal thermometer main housing 10 is generally curved, e.g., oval or circularly-disk-shaped, resembling a partially flattened egg and includes a circumferential edge 12.

The main housing 10 encloses the temperature sensing and processing circuitry 26. The main housing further includes a first side 16 and a second side 18. The first side 16 may include the thermometer actuation button 22 to activate/deactivate the rectal thermometer and the second side may contain a battery receiving compartment 24 for holding batteries which power the thermometer, or vice versa. Preferably, the first and second sides of the main housing 10 are adapted to be concave in shape and thus allow easier handling by the user. In other words, the thickness of the housing 10, measured between the first and second sides 16 and 18, narrows near the center of the sides 16 and 18.

The concave design for the main housing 10 is more ergonomically pleasing to the user of the rectal thermometer 2 and results in better handling and more accurate placement during use, which in turn results in an accurate and errorless temperature reading from a single use of the thermometer. The reason for the improved secure handling of the rectal thermometer 2 is due to the fact that the concave shape allows the thermometer 2 to fit snuggly into the natural curvature of the user's palm. The thicker portion of the housing completely contacts the palm of the user and thus requires minimal force to hold the thermometer 2 in one's hand. Moreover, as previously mentioned, insertion of the rectal thermometer 2 into the anal canal may stimulate the bowels of a newborn and cause significant squirming. The increased security and comfort in handling of the thermometer provided by the housing 10, as mentioned, adds to the improved efficiency of the rectal temperature taking process as the thermometer is less likely to fall to the floor due to the squirming child. The thermometer is also easier to insert into the anal canal given the possible awkward positioning of the child's body.

In the preferred embodiment, the digital display 20 is situated along the circumferential edge 12 of the housing 10. The taking of a child's rectal temperature typically requires placing the child on their stomach, on their back with the child's legs up or on their side. The digital display 20 is situated along the circumferential edge 12 so that the digital display 20 can easily be read while the rectal thermometer 2 is within the anal canal. Situating the digital display 20 along the circumferential edge 12 avoids the problems of having to remove the thermometer solely to read the display or twisting one's head to the side in an extremely awkward position merely to read the digital display while the thermometer remains inserted. The possibility that the rectal thermometer will become dislodged from the anal canal while the user attempts to read the temperature display 20 is greatly reduced due to the convenient location of the display 20.

Connected to the main housing 10 is the controlled-depth temperature sensing probe 30. The probe 30 includes a probe sensing tip 32 and a probe guard portion 34. The probe sensing tip 32 includes conductive metal and is preferably made of stainless-steel. The probe sensing tip 32 houses a conventional thermistor for sensing the temperature of the anal canal. The housing 10 is connected to the probe 30 via the probe guard portion 34. Preferably, the probe guard portion 34 is an extension of the housing 10 created through an overmolding process and, therefore, securely holds the probe 30 in place. Additionally, the probe guard portion 34 is wider in thickness proximal to the housing 10 and narrower toward the distal direction. As will be described in more detail below, the widening probe guard portion 34, in conjunction with the controlled-depth temperature sensing probe 30, helps to prevent over-insertion of the rectal thermometer.

The controlled-depth temperature sensing probe 30 ensures that the over-insertion problems associated with past rectal thermometers do not occur. As previously mentioned, the probe 30 is designed to be of a particular length, specifically about one-half of an inch. That length has been determined to be the ideal depth to which a rectal temperature sensing device should be placed into the anal canal for accurately measuring the core body temperature of an infant. In fact, placing a rectal temperature measuring device beyond the one-half inch depth may result in inaccurate readings or, worse, damage to the tissue surrounding the anal canal. Accordingly, the probe 30 is designed such that the entire length of the probe 30 is insertable into the anal canal of the rectal region without concern for over-insertion since it is of the particular length previously described. Since the probe 30 is a predetermined length, and is inserted a predetermined distance, i.e., the length of the probe, proper placement of the probe sensing tip 32 within the anal canal is consistently achieved. This ensures fast and accurate assessment of the core body temperature of a baby through the rectal region without having to determine the proper placement depth for the thermometer and its probe.

As previously noted, connecting the probe 30 to the main housing is the probe guard portion 34. The probe guard portion 34, as mentioned earlier, increases in width proximate the main housing 10. The gradual increase in width or thickness of the probe guard portion 34 provides the patient with the comfort of a subtly increasing pressure about the anal canal that slows the thermometer 2 down and allows the thermometer 2 to sit comfortably within the anal canal. Additionally, the use of the widening probe guard portion 34 helps to further prevent over-insertion of the rectal thermometer. The reason for this is that the user can easily determine, by viewing the insertion of the rectal thermometer 2, the point at which the rectal thermometer 2 has been inserted to its maximum depth. That maximum depth occurs when the widest point of the probe guard portion 34 is within the anal canal.

In order to safeguard the rectal thermometer 2 and its primary components, such as its probe sensing tip 32, the rectal thermometer includes a removable thermometer holder 40 that is placed over the rectal thermometer 2 when not in use. The thermometer holder 40 includes a proximal end 42 and a distal end 44 and is adapted such that its shape generally conforms to the shape of the rectal thermometer 2 and at least a portion of the rectal thermometer 2 is completely covered by the thermometer holder 40. The proximal end 42 covers at least a portion of the housing 10 and may include openings 50 to allow access to the actuation button 22 and the battery receiving compartment 24. The distal end 44 should be rounded and large enough to house rattle balls 48 and also to avoid any possible choking.

An alternative embodiment of the thermometer holder 40, as seen in FIG. 4, includes a thin neck 60 between the proximal end 42 and the distal end 44. The neck 60 tapers from the proximal end 42 and then flares toward the distal end 44. The thin neck 60 allows the holder 40 to be gripped more easily when removing or returning the thermometer 2. The thin neck 60 also provides a tighter fit over the probe 30. The thin neck 60 may include a flexible material to allow the thermometer holder 40 to bend.

The enclosed portion 46 at the distal end 44 that houses rattle balls 48 allows the thermometer holder 40 to also serve as a baby rattle. See FIG. 2. The benefit of having the thermometer holder 40 serve as a baby rattle is that it assists the user with the temperature taking process. Specifically, the patient can amuse him or herself with the rattle during the temperature taking process, thus reducing squirming. Alternatively, the thermometer holder 40 may include at the distal end a music player 44' or a teeter or elastic member 44". See FIGS. 5 and 6. Alternatively, the thermometer may include any simple toy known in the art for amusing infants, including but not limited to: a horn, a rotatable image, a noise maker, or a bean bag.

The complete housing of the thermometer, including the main housing 10 and the probe guard portion 34, should be formed using a low thermal-conductivity material so that cooling of the patient's skin upon contact is minimized, and also so that the temperature sensor does not experience improper fluctuations in temperature caused by interferences such as ambient air temperatures. The housing 10 may be waterproof or water resistant so the rectal thermometer 2 can be submersed in soapy water to clean the probe and housing without fear of destroying the electrical circuitry. As previously noted, inserting a probe into the anal canal of a newborn tends to stimulate the bowels. The stimulation of the bowels results in the possible presence of stool which may contain infectious contaminants that should be removed from the probe and housing before re-using the thermometer. The benefits to the user utilizing a washable rectal thermometer are obvious in that contamination with infectious stool is prevented.

In accordance with another embodiment of the present invention, the rectal thermometer 2 includes all of the features of the previous embodiment with the added feature that the probe guard portion 34 is molded from a flexible material such as rubber or a light plastic. The flexibility of the probe guard portion 34 increases the comfort to the patient, and allows for improved contacting of the temperature sensor to the rectal region.

In use, the thermometer is removed from the thermometer holder 40 and the thermometer holder 40 may be given to the patient for self-amusement. The probe tip 32 is placed into the anal canal within the rectal region to sense the temperature thereof. The thermal resistor or thermistor within the sensor tip 32 produces an electronic signal that represents the core body temperature obtained from the rectal region. The electronic signal of the sensor is then transmitted to a processor within the electrical circuitry 26 which converts the electronic signal into a temperature reading. The temperature reading is transmitted to the temperature display unit 20 where the temperature is displayed in degrees Fahrenheit or Celsius.

While the invention has been shown by way of reference to a rectal thermometer and particularly shown and described with reference to preferred embodiments thereof, it will be understood by those skilled in the art that the present invention may be utilized in any digital thermometer and that various changes in form and details may be made therein without departing from the spirit and scope of the invention.

I claim:

1. A rectal thermometer comprising:
    a generally disk-shaped housing having at least one circumferential edge generally along a rim and containing temperature and processing circuitry;
    a probe guard portion having a distal end and a proximal end and having a curved profile in a region between said two ends and extending outward from said circumferential edge, said probe guard portion being connected to said circumferential edge at said proximal end;
    a controlled-depth temperature sensing probe having a predetermined length and a predetermined width and mounted on the distal end of said probe guard portion such that said temperature sensing probe is positioned a predetermined distance from said circumferential edge of said disk-shaped housing and such that said probe is configured to be inserted into a patient such that the probe guard portion allows insertion of generally the entire length of the probe and prevents insertion of said probe beyond the length of said probe;

wherein the width of said probe guard portion at said distal end is substantially equal to said predetermined width of said sensing probe; and a temperature display mounted on said circumferential edge of said disk-shaped housing such that said display is viewable during a temperature taking process.

2. The rectal thermometer of claim 1, wherein said thermometer is waterproof.

3. The rectal thermometer of claim 1, wherein said probe guard portion comprises at least one of a soft plastic and a rubber.

4. The rectal thermometer of claim 1, wherein said probe guard portion is tapered at said proximal end.

5. The rectal thermometer of claim 1, wherein said disk-shaped housing includes a first side, a second side and an activation button; and wherein said activation button is located on at least one of said first and second sides.

6. The rectal thermometer of claim 1, further comprising:
a holder to receive said thermometer;
wherein said holder has a proximal end and a distal end; and
wherein said holder covers said controlled-depth temperature sensing probe.

7. The rectal thermometer of claim 6, wherein said holder includes an opening allowing access to an activation button.

8. The rectal thermometer of claim 6, wherein said holder covers a major portion of said disk-shaped housing.

9. The rectal thermometer of claim 6, wherein said holder is tapered at said proximal end and is flared toward said distal end.

10. The rectal thermometer of claim 6, wherein said holder includes a toy.

11. The rectal thermometer of claim 10, wherein said toy is a rattle.

12. A thermometer comprising:

a generally disk-shaped housing having at least one circumferential edge generally along a rim and containing temperature and processing circuitry;

a probe guard portion having a distal end and a proximal end and having a curved profile in a region between said two ends and extending outward from said circumferential edge, said probe guard portion being connected to said circumferential edge at said proximal end;

a controlled-depth temperature sensing probe having a predetermined length and a predetermined width and mounted on the distal end of said probe guard portion such that said temperature sensing probe is positioned a predetermined distance from said circumferential edge of said disk-shaped housing and such that said probe is configured to be inserted into a patient such that the probe guard portion allows insertion of generally the entire length of the probe and prevents insertion of said probe beyond the length of said probe;

wherein the width of said probe guard portion at said distal end is substantially equal to said predetermined width of said sensing probe; and a digital temperature display mounted on said circumferential edge of said disk-shaped housing such that said display is viewable during a temperature taking process.

\* \* \* \* \*